(No Model.)

J. DEUSS.
OIL FILTER.

No. 488,264. Patented Dec. 20, 1892.

Witnesses:
Wm. Schulz
A. Jonghmans

Inventor:
J. Deuss
by his attorneys
Roeder & Briesen

UNITED STATES PATENT OFFICE.

JOSEPH DEUSS, OF GLADBACH, GERMANY.

OIL-FILTER.

SPECIFICATION forming part of Letters Patent No. 488,264, dated December 20, 1892.

Application filed September 17, 1891. Serial No. 405,944. (No model.)

*To all whom it may concern:*

Be it known that I, JOSEPH DEUSS, a subject of the German Emperor, residing at Gladbach, in Germany, have invented certain new and useful Improvements in Oil-Filters, of which the following is a full and complete specification.

This invention relates to a filter more particularly designed to recover lubricating oils and to separate them from any water which they may contain.

The invention consists in the various features of improvement more fully pointed out in the claim.

Figure 1:
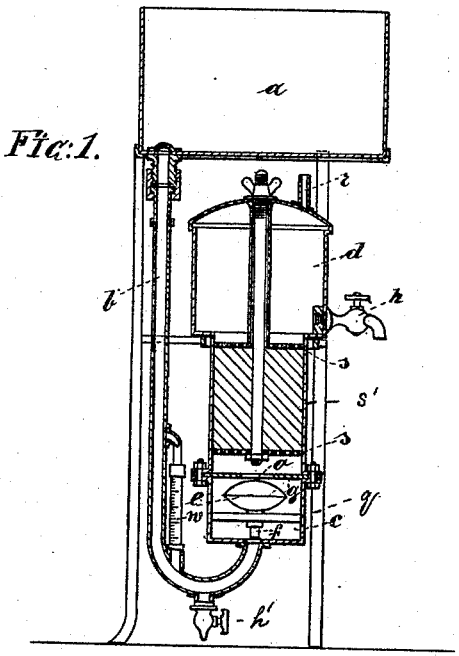
Figure 2:
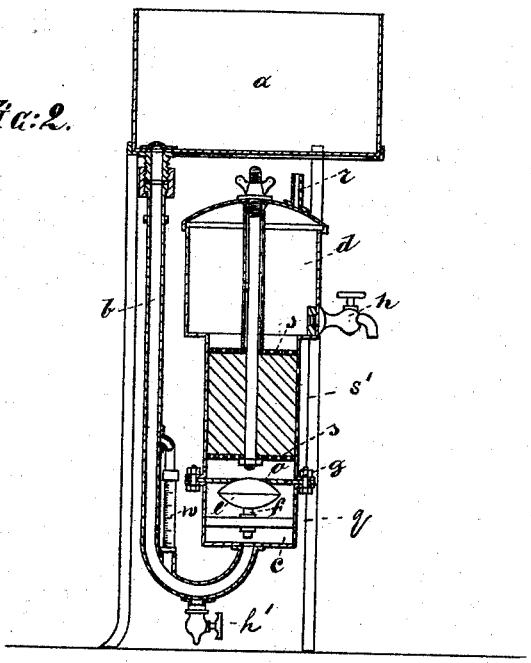

In the accompanying drawings: Figure 1 is a vertical central section of my improved filter, showing the float lowered. Fig. 2 is a similar section with the float raised.

The letter $a$, represents the receiving tank provided with a downwardly extending bent pipe $b$, which enters with its shorter arm, the bottom of the filtering chamber $c$, which is placed lower than tank $a$. This chamber is provided with a pair of perforated plates $s$, between which is contained a suitable percolator $s'$. Above the chamber $c$, there is secured a vessel or accumulator $d$, for the reception of the purified oil, such vessel being provided with the discharge cock $d$, and a vent $r$. Across chamber $c$, there is stretched below the lowermost plate $s$, a rubber diaphragm $g$, perforated at the center as at $o$. A float $e$, which is heavier than oil, but lighter than water, is placed below the diaphragm $g$, and when raising, is adapted to close the opening $o$. The float $e$, is provided with a stem $f$, guided in the cross piece $q$. A suitable gage $w$, that indicates the height of the water column, is attached above the bend of pipe $b$, either to the pipe or to the chamber $c$. At its lowermost point, the pipe $b$, is provided with a cock $h'$.

The oil to be filtered is poured into receiving tank $a$ and will through tube $b$, rise into the chamber $c$. Here it will pass up through diaphragm $g$, perforated plates $s$, and percolator $s'$, to be properly cleaned and will then enter the accumulator $d$, from which it may be drawn by cock $h$. If water is contained within the oil, it will separate and settle by its gravity in the bend of pipe $b$, or in the lower part of chamber $c$, and when the gage $w$ indicates a large accumulation, the water is tapped off through cock $h'$.

In case the apparatus is not under supervision, the rising water, on approaching the diaphragm $g$, will lift the float $e$, and thereby close the perforation in such diaphragm. (Fig. 2.) Thus the filter will be stopped automatically and water cannot enter the oil in the accumulator.

What I claim is:

The combination of bent inlet pipe $b$ with a communicating filtering chamber, a perforated diaphragm within the same, a float beneath the diaphragm having a specific gravity greater than oil and less than water, and with a percolator above the diaphragm and an accumulator, substantially as specified.

In testimony whereof I have signed this specification in the presence of two subscribing witnesses.

JOSEPH DEUSS.

Witnesses:
D. J. PARTELLO,
W. OTTO.